(12) United States Patent
Stein et al.

(10) Patent No.: US 8,553,088 B2
(45) Date of Patent: Oct. 8, 2013

(54) SYSTEMS AND METHODS FOR DETECTING OBSTRUCTIONS IN A CAMERA FIELD OF VIEW

(75) Inventors: Gideon Stein, Jerusalem (IL); Ofer Hadassi, Modiin (IL)

(73) Assignee: Mobileye Technologies Limited, Nicosia (CY)

( * ) Notice: Subject to any disclaimer, the term of this patent is extended or adjusted under 35 U.S.C. 154(b) by 1818 days.

(21) Appl. No.: 11/562,998

(22) Filed: Nov. 23, 2006

(65) Prior Publication Data

US 2007/0115357 A1    May 24, 2007

Related U.S. Application Data

(60) Provisional application No. 60/738,991, filed on Nov. 23, 2005.

(51) Int. Cl.
*H04N 7/18* (2006.01)
*G06K 9/00* (2006.01)

(52) U.S. Cl.
USPC .......................................... 348/148; 382/104

(58) Field of Classification Search
USPC ................... 348/148; 340/435, 438; 382/104; 250/208.1; 352/132; 701/36
See application file for complete search history.

(56) References Cited

U.S. PATENT DOCUMENTS

| | | | |
|---|---|---|---|
| 5,096,287 A * | 3/1992 | Kakinami et al. | ............ 352/132 |
| 5,923,027 A | 7/1999 | Stam et al. | |
| 6,392,218 B1 | 5/2002 | Kuehnle | |
| 6,681,163 B2 * | 1/2004 | Stam et al. | ........................ 701/36 |
| 6,768,422 B2 | 7/2004 | Schofield | |
| 6,853,897 B2 * | 2/2005 | Stam et al. | ........................ 701/36 |
| 7,015,944 B2 * | 3/2006 | Holz et al. | ...................... 348/148 |
| 7,113,867 B1 | 9/2006 | Stein | |
| 7,196,305 B2 * | 3/2007 | Shaffer et al. | .............. 250/208.1 |
| 7,609,857 B2 * | 10/2009 | Franz | ............................. 382/104 |
| 7,718,943 B2 * | 5/2010 | Johnson et al. | ............ 250/208.1 |
| 2005/0206511 A1 * | 9/2005 | Heenan et al. | ................ 340/438 |
| 2007/0182528 A1 * | 8/2007 | Breed et al. | ................... 340/435 |

OTHER PUBLICATIONS

Cambridge Univ. Press, Cambridge, UK, Cristianini and Shawe-Taylor, "An Introduction to Support Vector Machines and Other Kernel Based Learning Methods".
Scholkopf, Burges and Smola Eds, Advances in Kernel Methods; Support Vector Learning, The MIT Press, Cambridge, MA.

\* cited by examiner

*Primary Examiner* — Gims Philippe
(74) *Attorney, Agent, or Firm* — The Law Office of Michael E. Kondoudis

(57) ABSTRACT

A system mounted on a vehicle for detecting an obstruction on a surface of a window of the vehicle, a primary camera is mounted inside the vehicle behind the window. The primary camera is configured to acquire images of the environment through the window. A secondary camera is focused on an external surface of the window, and operates to image the obstruction. A portion of the window, i.e. window region is subtended respectively by the field of view of the primary camera and the field of view of the secondary camera. A processor processes respective sequences of image data from both the primary camera and the secondary camera.

21 Claims, 13 Drawing Sheets

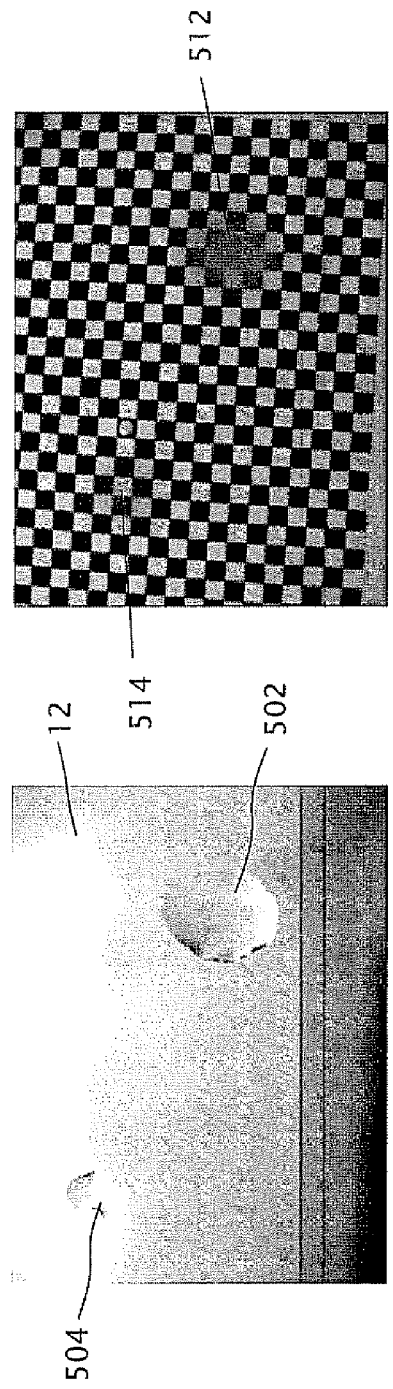
Fig. 9a
Fig. 9b
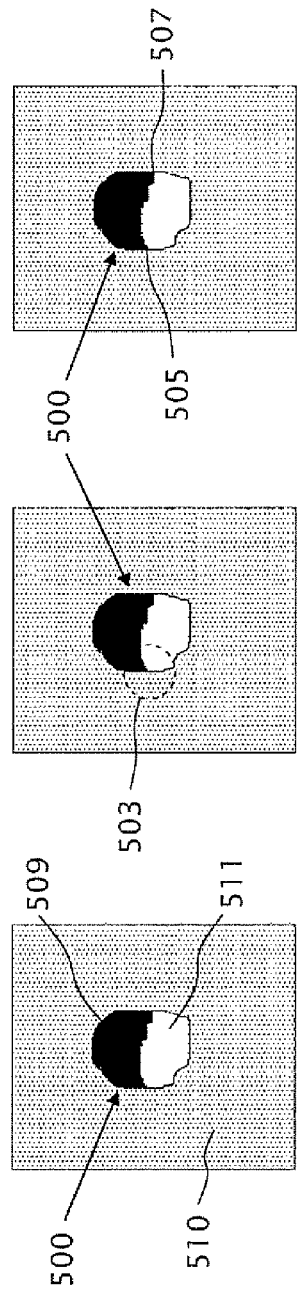
Fig. 10a
Fig. 10b
Fig. 10c

SYSTEMS AND METHODS FOR DETECTING OBSTRUCTIONS IN A CAMERA FIELD OF VIEW

CROSS REFERENCE TO RELATED APPLICATIONS

This application claims the benefit under 35 USC 119(e) from U.S. provisional application 60/738,991 filed Nov. 23, 2005, the disclosure of which is included herein by reference.

FIELD OF THE INVENTION

The present invention relates to detecting and classifying obstructions on the windshield of an automobile as part of a vehicle control system and more particularly the present invention detects and identifies obstructions on the windshield using a camera focused on the plane of the windshield.

BACKGROUND OF THE INVENTION AND PRIOR ART

Cameras are often used to acquire one or more images while viewing through a transparent window such as of glass. One such application is illustrated in FIG. 1, a vehicle control system 80 as disclosed by Stein in U.S. Pat. No. 7,113,867. A camera 32 is mounted inside a "host" vehicle 10 behind the windshield, and camera 32 views the environment through the windshield. System 80 includes camera 32 and a processor 60 that analyzes the images acquired by camera 32. System 80 is operative to detect lane markings in road 20, pedestrians, other vehicles or obstacles, road signs. Commonly, the windshield becomes less transparent due to rain, condensed moisture and/or dirt and image quality of the images produced by camera 32 may be impaired.

U.S. Pat. No. 6,392,218, by Kuehnle, discloses a method for analyzing optical images to detect moisture on a surface such as a windshield of an automobile using a sensor that is mounted on the windshield of the vehicle. An image such as that of the hood of the vehicle is processed and blurriness in the image is associated with moisture on the windshield. The sensor includes an optical image detector and a microprocessor with supporting control circuitry. The optical image detector acquires two-dimensional optical images from either the vehicle itself or an area surrounding the vehicle (e.g. the hood, the road ahead of the vehicle). The acquired optical images are then delivered to the microprocessor, which analyzes the image to determine whether moisture (such as rain) exists on the windshield. Upon detection of sufficient moisture on the vehicle, the microprocessor circuitry can activate the windshield wipers. U.S. Pat. No. 6,392,218 is directed towards only detection of rain or moisture on the windshield.

U.S. Pat. No. 5,923,027, by Stam et al, discloses a method of detecting moisture on a surface of a windshield using a sensor in conjunction with an infrared LED. Edges of moisture (i.e. rain) are detected by the sensor. The LED is used to check for fog on the windshield based upon the manner in which light is reflected. All objects detected by the sensor, including bugs, dirt, and headlamps from oncoming vehicles which create a bright spot in the image would initially be interpreted as moisture which then causes the windshield wipers to be activated. It is only after the wipers have been activated, if the object remains on the windshield, is the obstruction flagged as something other than rain. The spontaneous, random motion of the wipers creates an unnecessary driving distraction for the driver. Additionally, this system cannot differentiate between fog on the inside of the window and fog on the outside of the window.

U.S. Pat. No. 6,768,422, by Scofield, et al, discloses a method for determining if there is moisture on the surface of a windshield using a sensor in conjunction with a polarizing filter. The sensor determines if rain is present by using an edge detection algorithm. Fog is checked for by the polarization patterns created in the image.

All of the above previously disclosed patents are limited by not being able to differentiate between various objects which might appear on a windshield of a vehicle—including, rain, dirt, dust, frost, bugs, cracks, and bird droppings. Additionally these systems are not able to distinguish between fog on the inside of the window and fog on the outside of the window.

None of the above prior art systems provide a solution to bright spots of oncoming vehicles, being misinterpreted as moisture.

Just as a driver of a vehicle responds differently to various obstruction on a windshield, e.g., turning on wipers, spraying the windows, enabling the defogger, etc, so to there is a need for and it would be advantageous to have a vehicular vision system capable of detecting and distinguishing between different obstructions, e.g., between moisture and dirt on the windshield of a vehicle, as well as being able to distinguish whether the obstruction is on the inside of the window, e.g., fog, smoke or dust, or on the outside of the vehicle, e.g., fog, frost, snow. And in order to minimize extraneous use of the wipers there is a need to for a vehicular vision system which is capable of differentiating between bright sots from oncoming vehicles and moisture on the window.

DEFINITIONS

The term "primary camera" as used herein refers to camera 32 mounted inside a vehicle and used in systems for detecting road lane markings, other vehicles, pedestrians, and/or road signs. Typically, primary camera 32 focuses on objects that are over five meters from the primary camera.

The term "secondary camera" as used herein refers to a camera mounted inside a vehicle and used for detecting obstructions on the windshield, according to the present invention. Typically, the secondary camera focuses on objects that are less than 20 cm from the camera.

The term "edge" as used herein refers to a series of adjacent points in a digital image at which the intensity as measured at the points changes noticeably. An edge may be caused by different phenomena including: (a) discontinuities in depth, (b) discontinuities in surface orientation and (c) variations in scene illumination.

The term "gradient" as used herein refers to a two dimensional vector with the components given by the derivatives in the horizontal and vertical directions, of the image intensity function at each image point. At each image point, the gradient vector points in the direction of largest possible intensity increase, and the length or magnitude of the gradient vector corresponds to the rate of change in that direction.

The term "windshield" as used herein refers to a window either flat or curved installed on a vehicle which is at least partially transparent in a portion of the visible spectrum but not significantly translucent, opaque or hazy.

The terms "window" and "windshield" are used herein interchangeably and refers to the front window of the vehicle, the back window or a side window.

The term "windshield region" as used herein refers to the area of a windshield of a vehicle, for example the windshield, subtended by the field of view of a camera situated inside the vehicle.

The terms "classify" and "identify" are used herein interchangeably in the context of classifying or identifying obstructions on a window.

SUMMARY OF THE INVENTION

According to the teachings of the present invention there is provided a system mounted on a vehicle for detecting an obstruction on an external surface of the windshield of the vehicle. A primary camera is mounted inside the vehicle; the primary camera is configured to acquire images of the environment through the windshield. A secondary camera is focused on an external surface of the windshield, and operates to image the obstruction. A portion of the windshield, i.e. windshield region is subtended respectively by the field of view of the primary camera and the field of view of the secondary camera. A processor processes respective sequences of image data from both the primary camera and the secondary camera.

In vision systems where the image analysis is at least partially based on edge detection, such edges are represented in the images by high spatial frequencies. If the windshield is sufficiently clean, no edges or only edges with insignificant gradient will show in the images of the secondary camera.

According to the present invention there is provided a computerized system including a camera mounted on a vehicle for classifying at least one obstruction on a surface of a window of the vehicle, the system including: (a) a secondary camera mounted inside the vehicle, the secondary camera focusing on at least a portion of the surface of the window, and (b) a processor which processes a plurality of secondary images acquired by the secondary camera, and identifies the obstruction when present on the surface. The surface of the window can be selectably either the external surface of the window or the internal surface of the window.

The system further includes a primary camera mounted inside the vehicle, the primary camera configured to acquire multiple primary images of the environment through the window. A region of the window is subtended by respective fields of view of the secondary camera and the primary camera. The processor processes respectively at least one of the primary images and at least one of the secondary images.

The processor can use information extracted from the at least one primary image to selectably either enhance identifying the at least one obstruction or eliminating false identification of an obstruction.

The obstruction may cause a deterioration of the quality in the primary image. The processor is capable of determining the deterioration of image quality in the primary images.

The system may further include an activation mechanism operatively attached to the processor. The activation mechanism causes cleaning fluid to be sprayed on the window and windshield wipers to be activated when the processor identifies an obstruction, including dirt on the window while the surface is dry. When the obstruction includes dirt and moisture the processor activates the wiper.

When the processor identifies an obstruction, the processor initiates a task to remove the obstruction. The task is selected from the group of tasks consisting of: notification of the driver of the vehicle, disabling the system, activating wipers with or without cleaning fluid and activating defogging, turning on fog lights.

The secondary camera may also focus on at least a portion of the internal surface of the window and identify an obstruction when present on internal surface.

The secondary camera may perform tasks for the primary camera selected from the group of applications consisting of: ambient light sensing, gain control sensing.

The system may further include a pulsing light source, capable of illuminating a region of the window. The secondary camera is synchronized with the pulsing of the light source and images the illuminated region.

According to the present invention there is provided a method for classifying at least one obstruction on a surface of a window of a vehicle, using a computerized system including a camera mounted on the vehicle for, the method including: (a) providing a secondary camera mounted inside the vehicle focusing on a surface of the window, and providing a secondary image of the surface; and (b) processing the secondary image thereby identifying an obstruction when present on the surface. The method may include edge detection to detect the obstruction.

The method may further include providing a primary camera mounted inside the vehicle, configured to acquire multiple primary images of the environment through the window. A region of the window is subtended by respective fields of view of the secondary and the primary camera. The processing of a primary image yields detecting at least one obstruction and determining deterioration of image quality in the primary image, which is caused by the obstruction.

Identifying an obstruction is also performed by processing a primary image which may selectably either enhance the identification of the obstruction or eliminating a false identification of an obstruction.

The method may use the secondary camera ambient light sensing set the mode of the system to selectably either day mode, dusk mode or night mode and optionally, when determining the level of ambient light as being of dusk mode or night mode, turning on the headlights.

The method can identify the obstruction is being one in the group consisting of: rain, dirt, mud, snow, frost, cracks, smoke, dust, condensation, smeared insects and bird droppings. Upon identifying an obstruction, the method initiates a task to remove the obstruction. The task is selected from the group of tasks consisting of: notification of the driver of the vehicle, disabling the system, activating windshield wipers, spraying fluid on windshield and activating defogging of a window.

The processing of a primary image may include at least one other vehicular vision processing application selected from the group of applications consisting of: detecting lane markings in a road, detecting pedestrians, detecting vehicles, detecting obstacles, detecting road signs, lane keeping, headway keeping and headlights control. The application may be turned off, when an obstruction is identified.

The identifying of the obstruction may include classifying the obstruction, using a Support Vector Machine (SVM) techniques or SVM with Radial Basis Function kernel techniques or any other technique know in the art.

The method may further include illuminating the window with a pulsing light source, whereas the secondary camera is operated synchronously with the pulsing light source.

These and other advantages of the present invention will become apparent upon reading the following detailed descriptions and studying the various figures of the drawings.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIG. 9a shows an example image of rain drops on the windshield as viewed by the secondary camera of a camera obstruction detecting system, in accordance with an embodiment of the present invention.

FIG. 9b shows the example of the rain drops on the windshield illustrated in FIG. 9a, as viewed by the primary camera of a camera obstruction detecting system, in accordance with an embodiment of the present invention.

FIGS. 10a, 10b and 10c illustrate a raindrop and its tri-points that are a distinctive feature of raindrops.

DESCRIPTION OF THE PREFERRED EMBODIMENTS

Figure 1:
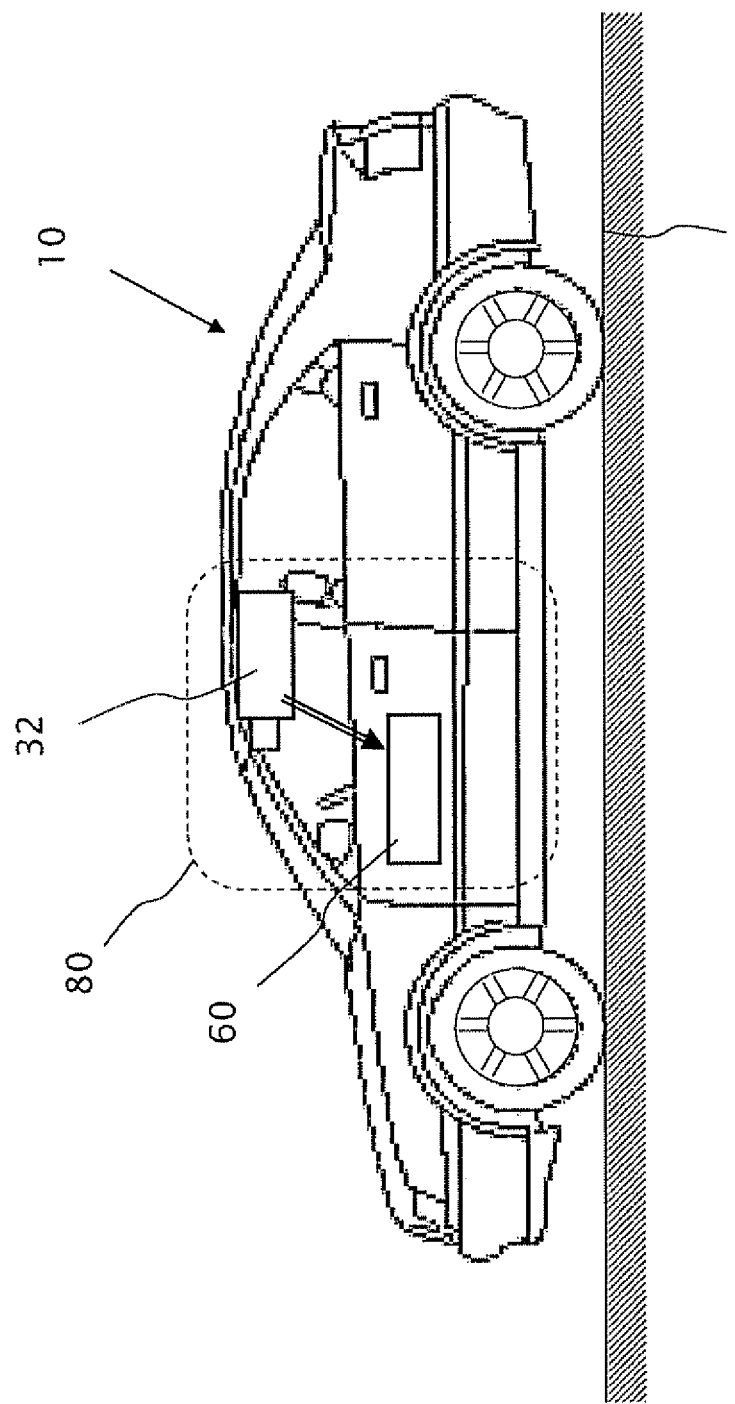
FIG. 1 illustrates a prior art system installed in a vehicle having a primary camera, designated to detect road lane markings, pedestrians, other vehicles or obstacles, and/or road signs.

The present invention is a system mounted on a vehicle for detecting an obstruction on an external surface of a windshield of the vehicle. A primary camera typically used for a driver's warning system and/or for a vehicle control system, is mounted inside the vehicle behind the windshield. The primary camera is configured to acquire images of the environment through the windshield. A secondary camera is focused on a surface of the windshield. Due to the angle of the windshield a portion of the secondary camera is focused on the external surface of the windshield, and a portion of the secondary camera is focused on the interior of the window. The secondary camera operates to image the obstruction. A portion of the windshield, i.e. windshield region is subtended respectively by the field of view of the primary camera and the field of view of the secondary camera. The primary and secondary cameras work in conjunction with each other in order to assure that there are no obstructions blocking the primary camera, and to minimize unnecessary image processing of the secondary camera (e.g., in the case whereby the primary camera recognizes bright points of light from on-coming vehicles and notifies the secondary camera that the bright spot is indeed a light source and not moisture or some other obstruction on the windshield.)

Before explaining embodiments of the invention in detail, it is to be understood that the invention is not limited in its application to the details of construction and the arrangement of the components set forth in the host description or illustrated in the drawings.

Unless otherwise defined, all technical and scientific terms used herein have the same meaning as commonly understood by one of ordinary skill in the art of the invention belongs. The methods and examples provided herein are illustrative only and not intended to be limiting.

By way of introduction, the principal intentions of the present invention include detecting and classifying different obstructing substances on the windshield.

An aspect of the present invention is to distinguish between the various causes of image impairment since different causes of image impairment require a different response from the driver. In particular (a) rain drops and snow flakes prompt activation of the wipers, (b) dirt prompts the activation of the wipers with fluid and if the dirt persists, the driver is optionally prompted to manually clean the windshield, (c) smoke and dust particles collected on the inside of the windshield might require special service, (d) fog prompts lighting of fog light and (e) condensation prompts activating a defogger. Thus it is important to be able to distinguish between the different causes of image impairment. When an obstruction is detected, a low visibility signal may be generated indicating possible system unavailability due to image impairment.

Figure 12B:
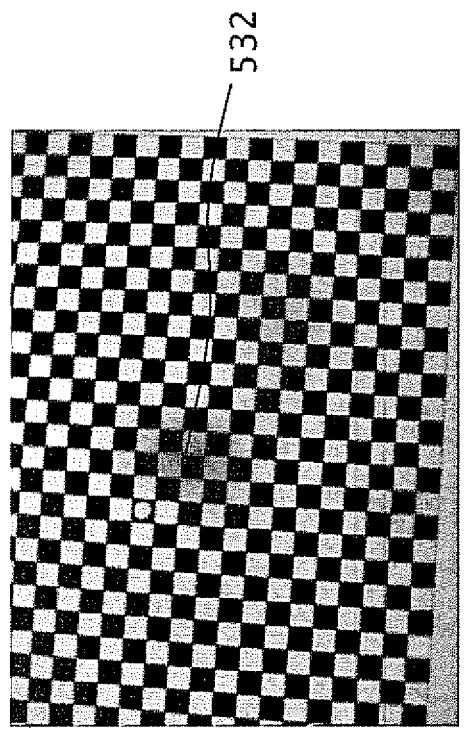
FIG. 12b shows the example of the opaque obstruction on the windshield illustrated in FIG. 12a, as viewed by the primary camera of a camera obstruction detecting system, in accordance with an embodiment of the present invention.
Figure 12A:
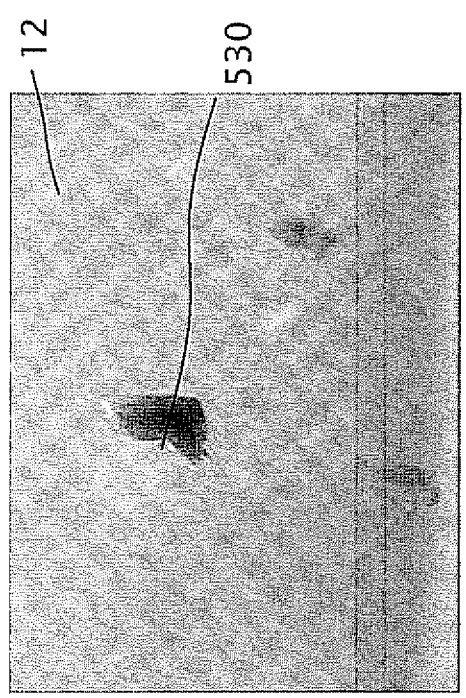
FIG. 12a shows an example image of an opaque obstruction on the windshield, as viewed by the secondary camera of a camera obstruction detecting system, in accordance with an embodiment of the present invention.
Figure 13:
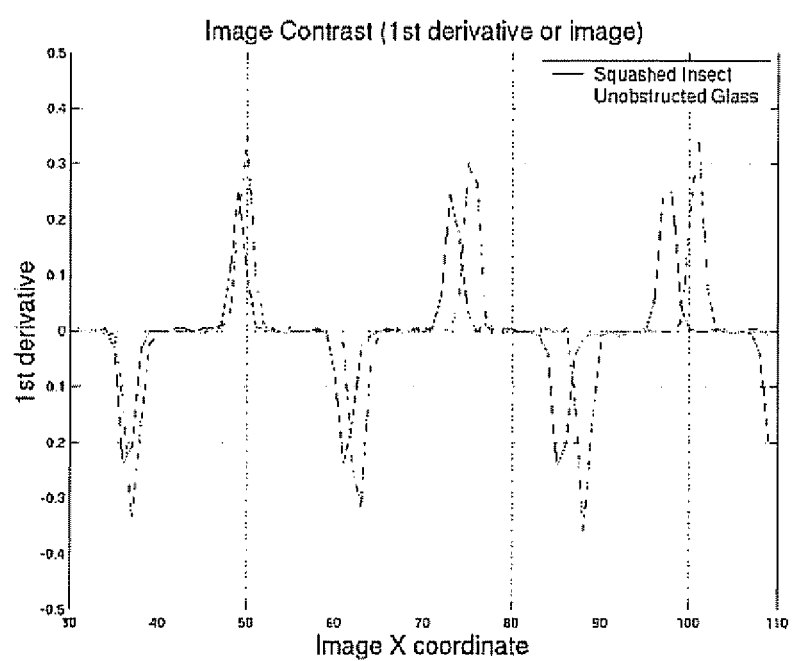
FIG. 13 shows, by way of example, the drop in image contrast of primary images, caused by a smeared/squashed insect.

It is another aspect of the present invention to integrate the detection and identification of the obstructions on the windshield with the function of the primary camera, i.e. a driver's warning system and/or for a vehicle control. It should be noted that all obstructions on the windshield very similar in the images acquired by the primary camera, the primary camera being typically focused on objects outside the vehicle. Obstructions as viewed by the primary camera appear as blurred images, because the windshield and the obstructions on an external and internal surface of the windshield are significantly out of focus. Thus the primary camera is preferably not used to determine the cause of the visibility impairment. FIG. 9a shows an example image of rain drops (502 and 504) on windshield 12 as viewed by the secondary camera. The rain drops are imaged by the primary camera as a blurred patch 512 and 514, shown in FIG. 9b, while imaging a distant checkerboard-like target FIG. 12a shows an example image of dirt (530) on windshield 11 as viewed by the secondary camera. The dirt is imaged by the primary camera as a blurred patch 532, shown in FIG. 12b, while imaging a distant checkerboard-like target.

Figure 2:
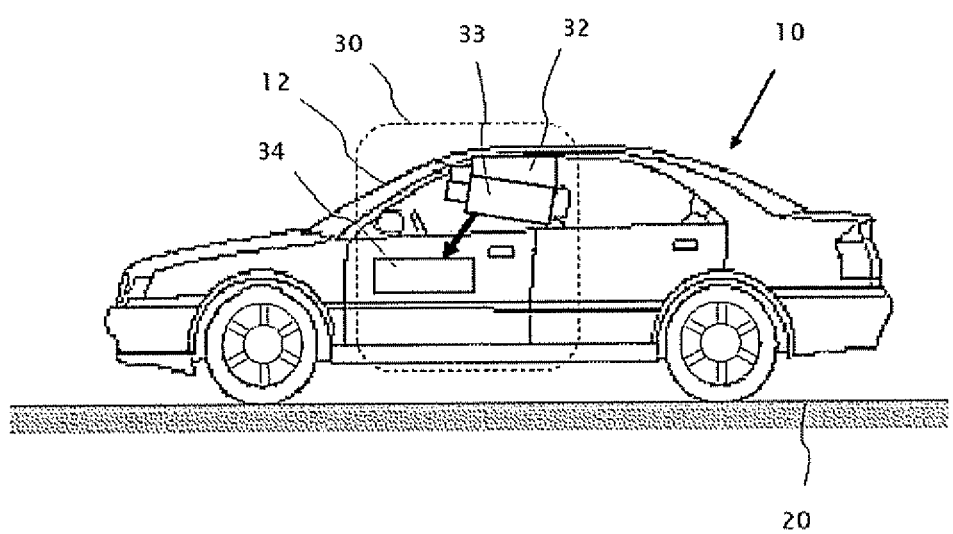
FIG. 2 illustrates a vehicle having a camera obstruction detection and classification system, in accordance with an embodiment of the present invention.

FIG. 2 illustrates a vehicle having a camera obstruction detection and classification system, in accordance with an embodiment of the present invention. FIG. 2 depicts a host vehicle 10 that travels on a road surface 20, having a camera obstruction detection system 30, including: a primary camera 32; a secondary camera 33; and a processing unit 34. Primary camera 32 is mounted on host vehicle 10 viewing the environment through windshield 12 with a field of view typically of 30-50 degrees. Secondary camera 33 is mounted on host vehicle 10 and focuses on windshield 12 preferably over a windshield region subtended at least in part by the field of view of primary camera 32.

Figure 3:
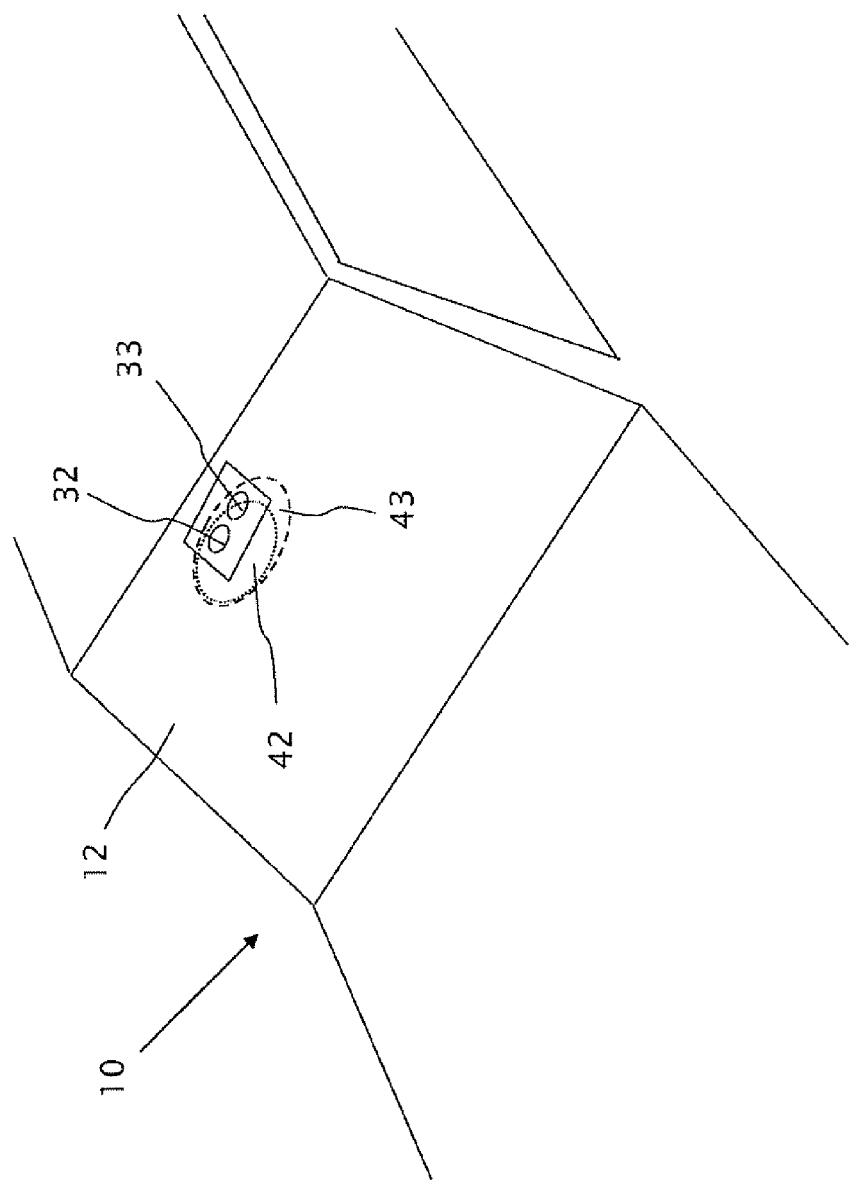
FIG. 3 is a perspective view that exemplifies a camera obstruction detecting and classifying system where the primary camera and the secondary camera are set side by side.

FIG. 3 is a perspective view of an example of a camera obstruction detecting system 30, having a primary camera 32 and a secondary camera 33 situated side by side. Windshield region 43 of secondary camera 33 is at least overlapping windshield region 42 of primary camera 32.

Figure 4:
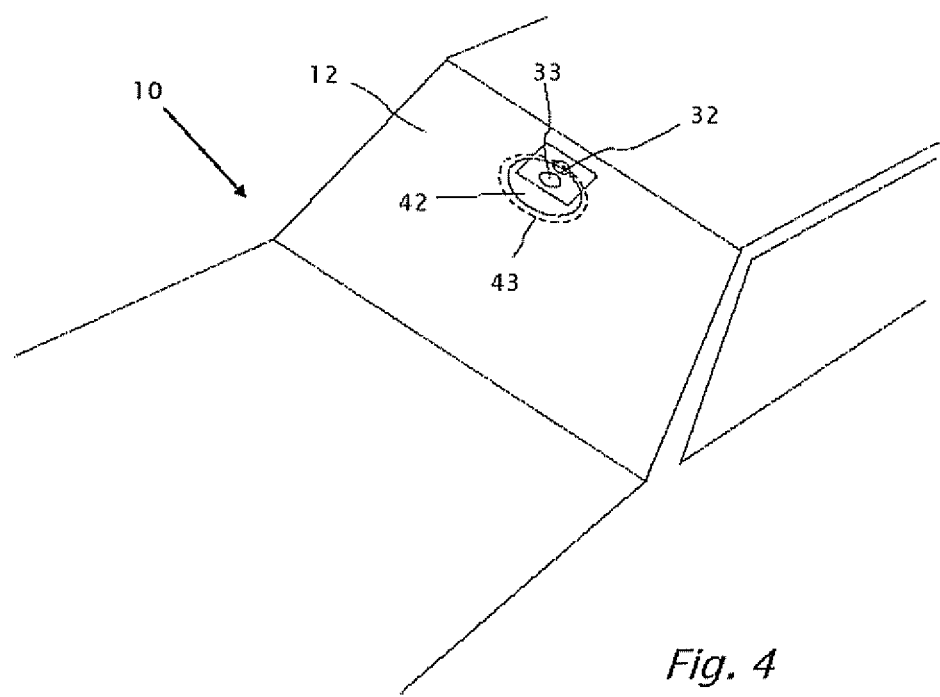
FIG. 4 is a perspective view that exemplifies a camera obstruction detection system where the primary camera and the secondary camera are set one below the other.

FIG. 4 is a perspective view that exemplifies a camera obstruction detection system 30 where primary camera 32 and secondary camera 33 are set one below the other. Windshield region 43 of secondary camera 33 is at least overlapping windshield region 42 of primary camera 32.

The present invention is not limited to a side-by-side embodiment or a top-down embodiment. The system may be mounted on a front or rear windshield, as well as on a side window—or behind any glass surface, for example behind the glass enclosure of the headlamps or tail lamps of the vehicle.

Figure 5:
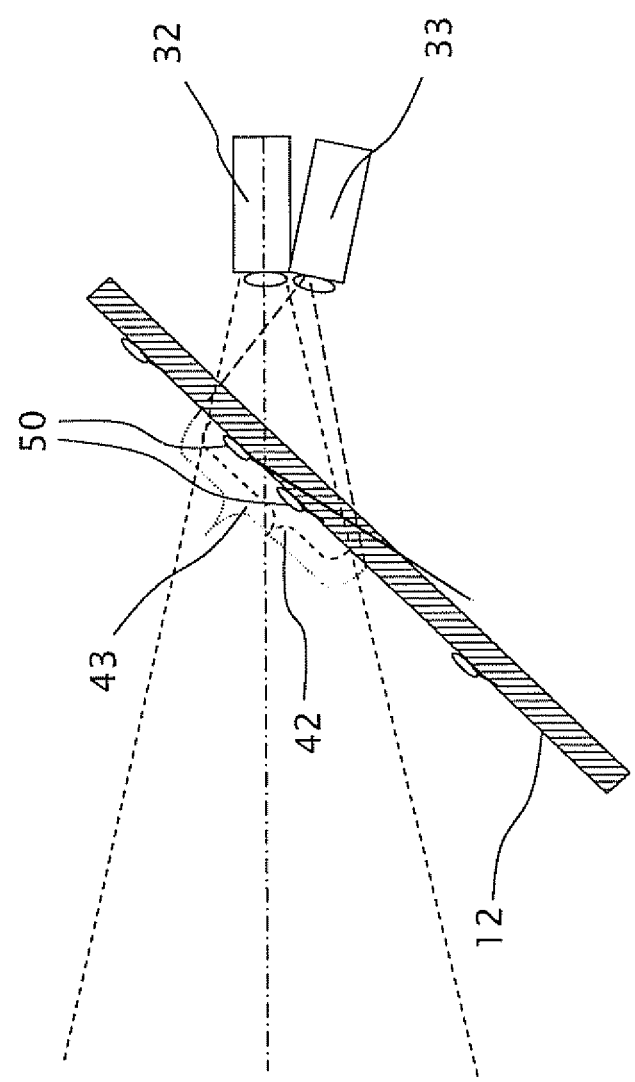
FIG. 5 is a close up side view illustrating a camera obstruction detection system where the primary camera and the secondary camera are set one below the other, behind the vehicle obstructed windshield.

FIG. 5 is a close up view illustrating a camera obstruction detection system 30 where primary camera 32 and secondary camera 33 are situated one below the other, behind windshield 12. Windshield 12 has light obstructing substances 50 stuck onto windshield 12 external surfaces and blocks some of the light returning to primary camera 32. Secondary camera 33 is focused on an external surface of windshield 12 preferably in region subtended by the field of view of primary camera 32. Typically, system 30 is continuously monitoring windshield 12, analyzing secondary images. In some embodiments, the analysis of identifying an obstruction 50 is triggered by the primary vision processor 60.

Often, the optical axis secondary camera 33 is not completely perpendicular to windshield 12 surface. Due to the thickness of windshield 12 and the finite depth of field of secondary camera 33, in some parts of the image, typically the lower parts of the image, the inner surface of the windshield 12 is most in focus. Typically, in the upper parts of the image, the outer surface of windshield 12 is most in focus. Having the ability to also focus secondary camera 33, in parts of the secondary image, on the inner surface of windshield 12 allows system 30 to determine, in a case of fog, condensation or smoke residue (which the camera picks up as texture) whether it is outside the vehicle 10 or on the inner surface of windshield 12. Having the ability to also focus secondary camera 33, in parts of the secondary image, on the inner surface of windshield 12 allows system 30 to also detect other obstructions on the inner surface of windshield 12, such as accumulated smoke particles, fog or dust, and to determine where the obstruction is on the inside or outside of windshield 12. One such situation where it is necessary to check the inside of windshield 12 is when there is fog on windshield 12. The driver might have turned on the defogger to clear windshield 12, and yet the region in front of the camera might still not be cleared of the fog or frost. By checking if the fog is on the inside or outside of windshield 12, the system will be able to determine the proper corrective action, e.g. whether to signal for the heater, defogger or low visibility mode.

Figure 6:
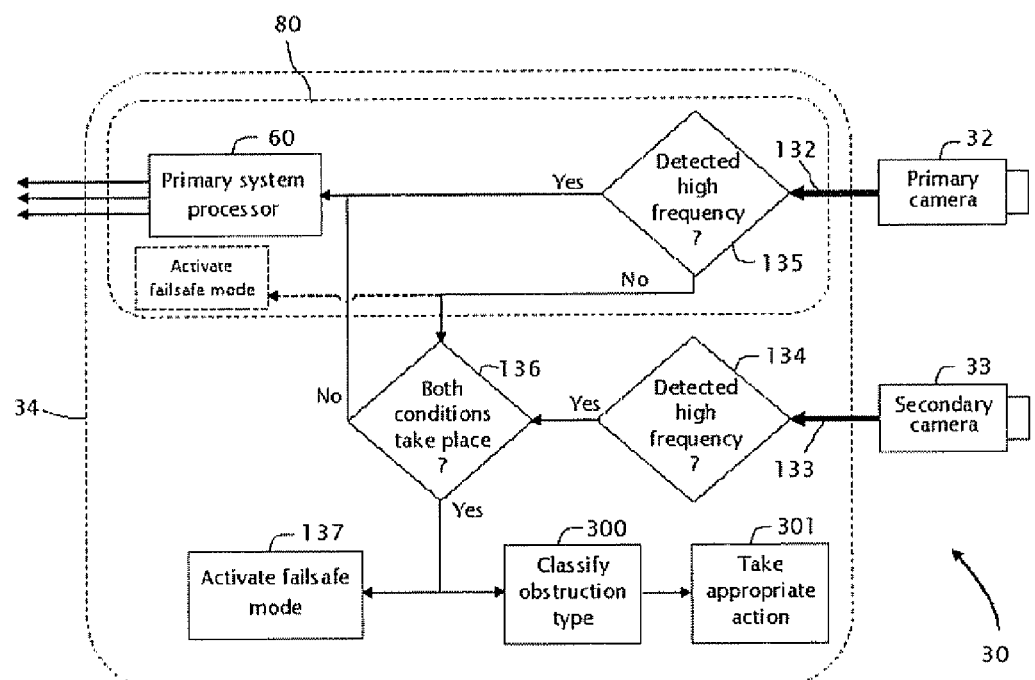
FIG. 6 is a schematic flow diagram showing the data and decision flow in a camera obstruction detecting system, in accordance with an embodiment of the present invention.

FIG. 6 is a schematic flow diagram showing data and decision flows in system 30, in accordance with an embodiment of the present invention. In a vision system 30 mounted on host vehicle 10, primary camera 32 views the scene in front of primary camera 32 through windshield 12 as in prior art vision system 80. Often, light passing through windshield 12 is at least partially blocked, attenuated, scattered or absorbed by obstructions 50 on the external surface of windshield 12, before reaching primary camera 32. Primary camera 32 acquires images and transmits (step 132) the acquired images to primary vision processor 60 to be processed. Secondary camera 33 transmits (step 133) the acquired images to a high frequency presence decision module 134 for processing.

Processor 34 detects substances 50 adhering to an external surface of windshield 12, and analyzes the image deterioration if any caused by detected light obstructing substances 50, on the images acquired by primary camera 32. The image deterioration caused by light obstructing substances 50 is considered negligible if the obstructed light has no measurable influence on the image quality from images from primary camera 32. The image deterioration when measured optionally causes system 30 to activate a low visibility mode, if the obstructed light reduces the performance of primary camera 32, but still executes part of the tasks. The image deterioration caused by light obstructing substances 50 can even cause primary camera 32 to stop function.

In vision systems, where the image analysis is at least partially based on edge detection, such edges are represented in the images by high spatial frequencies. If windshield 12 is sufficiently clean, edges with significant gradient do not show in the images acquired by secondary camera 33 if obstructions 50 are situated on a windshield region of windshield 12, then processing unit 34 determines the area on windshield 12 containing obstructions 50. The corresponding area in images acquired by primary camera 32 is also analyzed for high spatial frequencies. If the gradient of the edges detected is lower than some threshold, system 30 activates low visibility mode, having determined that obstructions 50 are present on a windshield region of windshield 12.

Referring back to FIG. 6, secondary camera 33 transmits (step 133) the acquired images to a high frequency presence decision module 134 to be processed. If processing unit 34 detects in images acquired by secondary camera 33, in step 134, high spatial frequencies, representing edges, and in respective regions of respective images obtained by primary camera 32 no high spatial frequencies are observed in step 135, decision step 136 activates a low visibility mode, in step 137. Obstructions 50 detected by processor 34 in the images acquired by secondary camera 33, are classified in step 300 and actions are taken in step 301 according to the type of obstructions 50 detected and classified.

Figure 8:
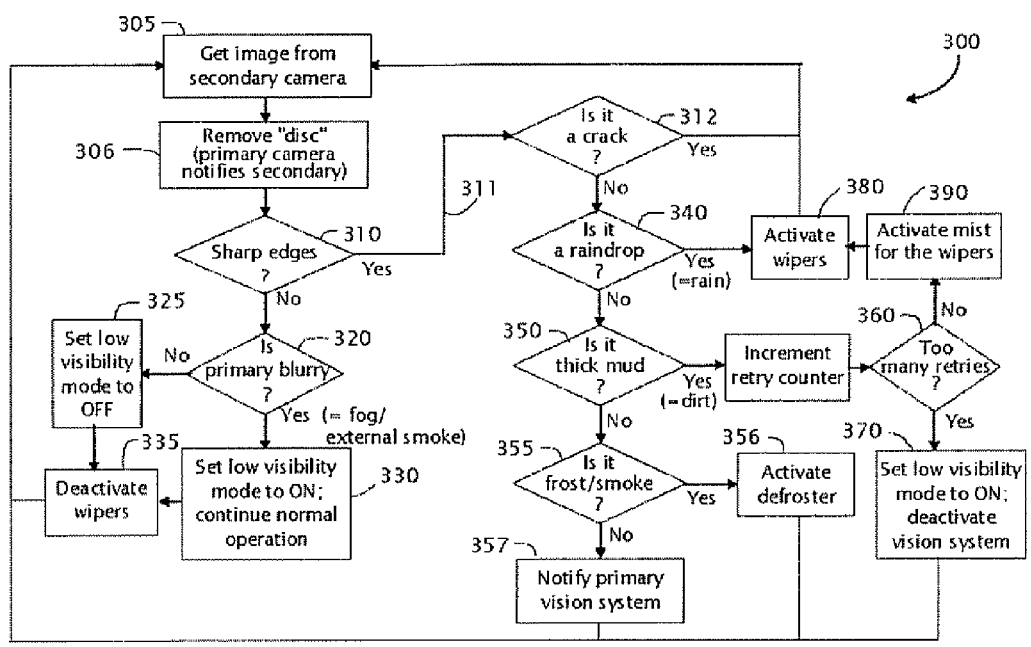
FIG. 8 is a schematic flow diagram illustration of selecting day and night modes for a camera obstruction detecting system, in accordance with an embodiment of the present invention.

FIG. 8 shows a schematic flow diagram outlining an algorithm 300 that exemplifies a method for classifying obstruction 50 types in a camera obstruction detecting system 30, according with an embodiment of the present invention. Obstructions 50 are detected by secondary camera 33, being focused on windshield 12.

As a preliminary step, system 30 maps out false edges in the secondary image obtained in step 305, for example, a distant light source appears as a focused point of light in the primary image. It is well known from optics, that in a camera that is focused on the near distance (the secondary camera in the present invention), this point of light will appear as a disc with sharp edges. Such discs with sharp edges must be eliminated (step 306) from further analysis. The masked out secondary images are analyzed in step 310 for high frequencies representing sharp edges. If no edges were detected, Images obtained in step 305 are analyzed in step 320 for blurry regions. If no blurry regions were detected in the primary image, algorithm 300 assumes windshield region 43 is clear. If low visibility mode was active, low visibility mode is turned off in step 325 and if the wipers were active the wipers are turned off in step 335. If blurry regions were detected in the primary image in step 320, fog, smoke (which is granular) or condensation situation or the like are assumed to persist; low visibility mode is activated in step 330 but if the wipers were activated, the wipers are turned off in step 335.

If in step 310 at least one edge is detected, system 30 proceeds into a classification procedure to classify 311 the detected obstruction 50. Images 110 obtained in step 305 are further analyzed in step 312 to determined id the obstruction is a crack in windshield 12. If the obstruction is a crack, the crack edges are masked out from the secondary image, and system 30 proceeds to obtain the next image in step 305. If the classification fails in step 312, system 30 looks for objects with bright, dark, and grey spots in step 340. Objects with bright, dark and grey spots characterize rain drops. Rain may be stationary or seen as moving depending on whether the vehicle is stationary or moving. If one or more moving objects with both bright and dark spots are detected in step 340, rain is assumed and the wipers are activated in step 380.

If in step 340 no raindrops are detected, further analysis action is taken in step 350 for detecting opaque objects such as thick mud. If in step 350 no opaque objects were detected, further analysis action is taken in step 355 for detecting semi-opaque objects such as frost or dust or smoke residue. If in step 350 no semi-opaque objects were detected, algorithm 300 assumes obstruction 50 represents an unknown obstruction 50. The unknown obstruction 50 might be a temporary obstruction, or a failing sensor, etc. Primary vision system 60 may be notified in step 357 and system 30 proceeds to obtain the next image in step 305.

If in step 350 one or more opaque object was detected an attempt is made to remove the detected opaque object by activating in step 390 the mist for the wipers and in step 380 the wipers themselves. If in step 360 after a preset number of attempts to remove obstructions 50 is surpassed and obstructions 50 sustains, primary system processor 60 (FIG. 6) is deactivated and the driver is preferably notified.

If in step 355 frost is detected an attempt is made to remove the frost by activating in step 356 the defroster. If smoke residue is detected the driver may be notified to remove the smoke residue.

The following gives the characteristics of various types of visual obstructions 50 and methods to detect them and remove them:

(a) As a preliminary step, system 30 maps out false edges in the secondary image, for example, a distant light source appears as a focused point of light in the primary image. It is well known from optics, that in a camera that is focused on the near distance (the secondary camera in the present invention), this point of light will appear as a disc with sharp edges. Such discs with sharp edges must be eliminated from further analysis. If primary camera 32 identifies a point of light, secondary camera 33 is notified exactly where this point of light is located. Secondary camera 33 then recognizes the corresponding disc of light with a known radius to have been produced by a light source and ignores the disc edges. System 30 looks for rings of a focus typical of distant point of light. The radius can be determined empirically or calculated by standard methods of optics, see for example MIT press, Berthold Horn, *Robot Vision*, included herein by reference for all purposes as if entirely set forth herein.

the radius can be determined empirically: the vertical and horizontal derivatives of the image are computed and are combined to a derivative magnitude image:

$$I_{mag} = \sqrt{I_x^2 + I_y^2} \quad (1)$$

a binary map of all pixels whose edge is above a certain threshold is computed. The threshold can be fixed or data dependent such as N*std over the mean, etc.

In an embodiment of the present invention, bright spots are detected in the primary image for identifying a distortion 50 at night time. For each detected bright spot, a ring of radius R and thickness T is dropped from further consideration (see equation 1). Steps are taken again to compute a derivative magnitude image. Then, the number of pixels C in $I_{mag}$ that are above a certain threshold are counted. The threshold can be fixed or data dependent such as N*std over the mean, etc. If C is greater than some threshold, then an obstruction is detected.

As an additional preliminary step, system 30 eliminates the areas which have remained on window 12 for a period of time. These could indicate 'poc-marks' on the window caused by small stones or some other small object which left a 'bullet-like' hole without actually having cracked window 12.

(b) Test for frost, dust and/or smoke particles: system 30 uses a RBF SVM (Support Vector Machine with Radial Basis Function Kernel), see for example: Cambridge University Press, Cambridge, UK, Cristianini and Shawe-taylor, *An Introduction to Support Vector Machines and other kernel based learning methods* included herein by reference for all purposes as if entirely set forth herein; or in Scholkopf, Burges and Smola Eds., *Advances in Kernel Methods: Support Vector Learning*, The MIT Press, Cambridge, Mass., included herein by reference for all purposes as if entirely set forth herein.

Frost and smoke-residue/dust (hereinafter referred to as smoke) each have their specific textures easily distinguishable to the human eye, and typically cover large areas A classifier trained on a predetermined window patch size, classifies an obstruction 50 as being a frost or smoke residue. System 30 classifies all patches (for example of size 16×16) in the image which do not include any of the previously detected obstacles using a template based classifier (such as RBF SVM) taught with examples of frost/smoke residue/clear/other, where 'other' includes examples of mud/rain/light mud etc. It should be noted that there are other techniques for classifying textures which are well published and can be sued to replace the classification step. Since the classifiers are binary classifiers, system 30 can use, for example, four separate sub-classifiers to classify a patch in the secondary image.

a. frost against smoke residue/clear/other;
b. smoke against frost/clear/other;
c. clear against frost/smoke residue/other; and
d. other against frost/smoke residue/clear.

The patch, in this example, is given the classification of the sub-classifier with the highest positive score. If all scores are negative it is classified as 'unknown'.

System 30 then computes the total area of frost by taking the union of all patches classified as frost, and the total area of smoke by taking the union of all patches classified as smoke residue. If total frost area exceeds a certain threshold or the number of patches classified as frost exceeds a certain threshold, then the condition is classified as 'possible frost'. If total smoke area exceeds a certain threshold or the number of patches classified as smoke exceeds a certain threshold, then the condition is classified as 'possible smoke residue'.

If both 'possible frost' and 'possible smoke residue' conditions exist, system 30 acts as if just frost exists, including: notifying the driver, activating a defrost mechanism, notifying primary vision system 60. If only the 'possible smoke residue' condition exists, system 60 must determine if the residue is really smoke residue on windshield 12 internal surface or some other fine residue on the external surface of windshield 12 (the image texture is very similar to that of fine pollen). To detect if the smoke residue texture is on the internal surface or external surface of windshield 12, system 30 compares the spatial frequencies of the texture in the upper and lower parts of the secondary image. Since windshield 12 is at an angle to the camera neither inner or out surfaces are completely in focus throughout the image. The optics can be designed such that the lower in the image, external surface is in focus and the internal surface is more in focus. In particular, the optics can be designed such that the transition line cuts through typical areas of smoke residue build up. If smoke buildup exists on the inner surface it might require service.

If 'possible smoke residue' conditions exist on the internal surface of windshield 12, appropriate actions are taken in step 301, for example: inform the driver: 'service is required'.

(c) Test for cracks: system 30 computes a derivative magnitude image, as in equation 1. If connected edges form a first long edge segment that are longer than a certain threshold N and the curvature of the edge segment is less than a certain threshold T and a second edge segment which is generally parallel to the first segment than system 30 classifies the obstruction 50 as being a crack in windshield 12. Furthermore, the crack segment points can be added to binary mask, not to be used for rain and other detections. If a second edge segment which is generally parallel to the first segment is not found, the obstruction 50 may be a sticker or flyer attached to windshield 12. If crack in windshield 12 or any other long obstruction 50 is identified, appropriate actions are taken in step 301, for example: notify the driver and/or low visibility mode is activated.

(d) Test for rain drops: In daytime, system 30 looks for strong horizontal edge components with dark patch above bright patch surrounded by a gray region FIG. 9a shows an example image of rain drops (502 and 504) on windshield 12 as viewed by secondary camera 33 Rain drops 502 and 504 are imaged by primary camera 32 as corresponding blurred patches 512 and 514, shown in FIG. 9b, while imaging a distant checkerboard-like target. System 30 computes a bounding box which includes both light and dark patches. System 30 then computes histograms of image gradient orientations for the four quadrants of the bounding box, and uses pattern, for example, a RBF SVM classifier trained on image gradient orientations, to classify as a rain drop.

In an embodiment of the present invention, system 30 looks a distinctive feature of raindrops: a junction of the three regions with different shades: dark, bright and grey. We hereinafter refer to these special junction points as tri-points, which typically positioned at either the on the left or the right of the rain drop.

Figure 11:
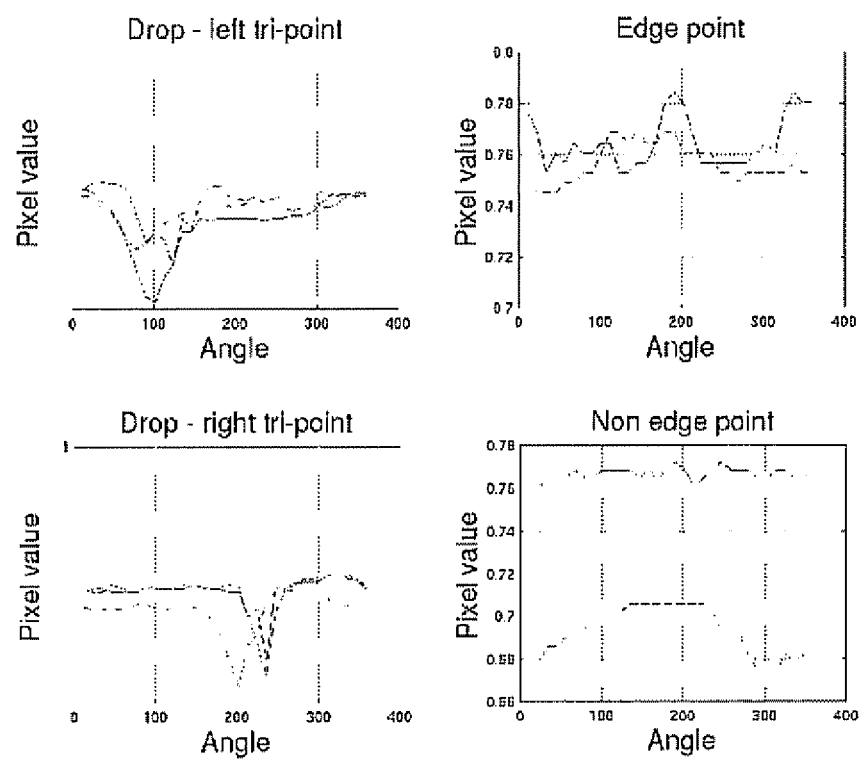
FIG. 11 shows, by way of example, a series of graphs characterizing the tri-points that are a distinctive feature of raindrops.

FIGS. 10a, 10b and 10c illustrate a typical raindrop 500 with tri-points 505 and 507 that are a distinctive feature of raindrops. The surrounding windshield 12 is a bit darker than the bright region 511 and lighter than the dark region 509 of a rain drop 500. The junction of the three regions with different shades: dark 509, bright 511 and grey 510 are highlighted by circle 503 in FIG. 10b. The junction is referred to as a tri-point. To locate such tri-points in the image system 30 analyzes all edge points in the image. For each edge point system 30 looks at the image brightness of the points along a circle of radius R (e.g. R=5 pixels) around the edge point being tested, such as circle 503. FIG. 10c shows the left tri-point 505 and right left tri-point 507. FIG. 11 shows examples of the brightness profiles on circles surrounding edge points that are tri-points, edge points that are only between two regions such as the edge of a patch of frost, and around points that are not on an edge. Tri-points can be subclassified into left and right tri-points. To classify, system 30 finds the best match to templates such as the templates shown in the FIG. 11, using nearest neighbor with a normalized correlation distance measure. The left and right tri-points (FIG. 11) that lie on the same edge segment (edge points, FIG. 11) are matched. For each matching pair left and right tri-points, that define a raindrop, system 30 may also verify that the edge segment has consistent sign along the edge elements and that the generally enclosed edge segment contains a dark region above a bright region. Also, the distance between points is below a certain value which depends on the specific optics. Another criterion that can be used is that the angle of the straight line joining the two tri-points is less than 45° from horizontal. One can estimate the area of a rain drop by taking the distance between the two tri-points, squared. If the number of rain drops detected exceeds a threshold or the total area of rain drops exceeds a threshold, then the windshield wipers are activate (step 380).

For the sake of clarity, it is noted that these methods may not detect all rain drops in every frame but these methods have a detection rate of above 80%, which is sufficient for this application.

At night time the scenery is different. Bright spots are detected in the primary image. For each detected bright spot, a ring of radius R and thickness T is matched in the secondary images. System 30 can then look for circles in the secondary image and see if there are breaks in the edge, indicating some interference on the external surface of windshield 12. If rain drops are detected, appropriate actions are taken in step 301, for example: activating the wipers in step 380.

(e) Test for snow flakes: system 30 uses, for example, RBF SVM classifier trained on a predetermined size patch, to classify an obstruction 50 as being a snowflake. If snow flakes are detected, appropriate actions are taken in step 301, for example: activating the wipers in step 380.

(f) Test for thick mud or light mud or squashed insect: light mud, squashed insect, bird droppings and the like, appear quite similar in the image. FIG. 12a shows an opaque obstruction 530 on windshield 12 as viewed by secondary camera 33. FIG. 12b shows the same example as viewed by primary camera 32. Obstruction 530 is imaged by primary camera 32 as blurred patch 532. FIG.

13 shows, by way of example, the drop in image intensity of primary images, caused by a smeared/squashed insect. The checker-board like image shows clearly a drop in intensity in the obstructed region. The main difference is the size of the affected area which is usually limited for insects and extensive for light mud. Since system 30 response is the same (activate wipers with fluid+notify primary vision system of affected regions) thick mud or light mud or squashed insect are detected in the same module and treated the same.

Figure 14:
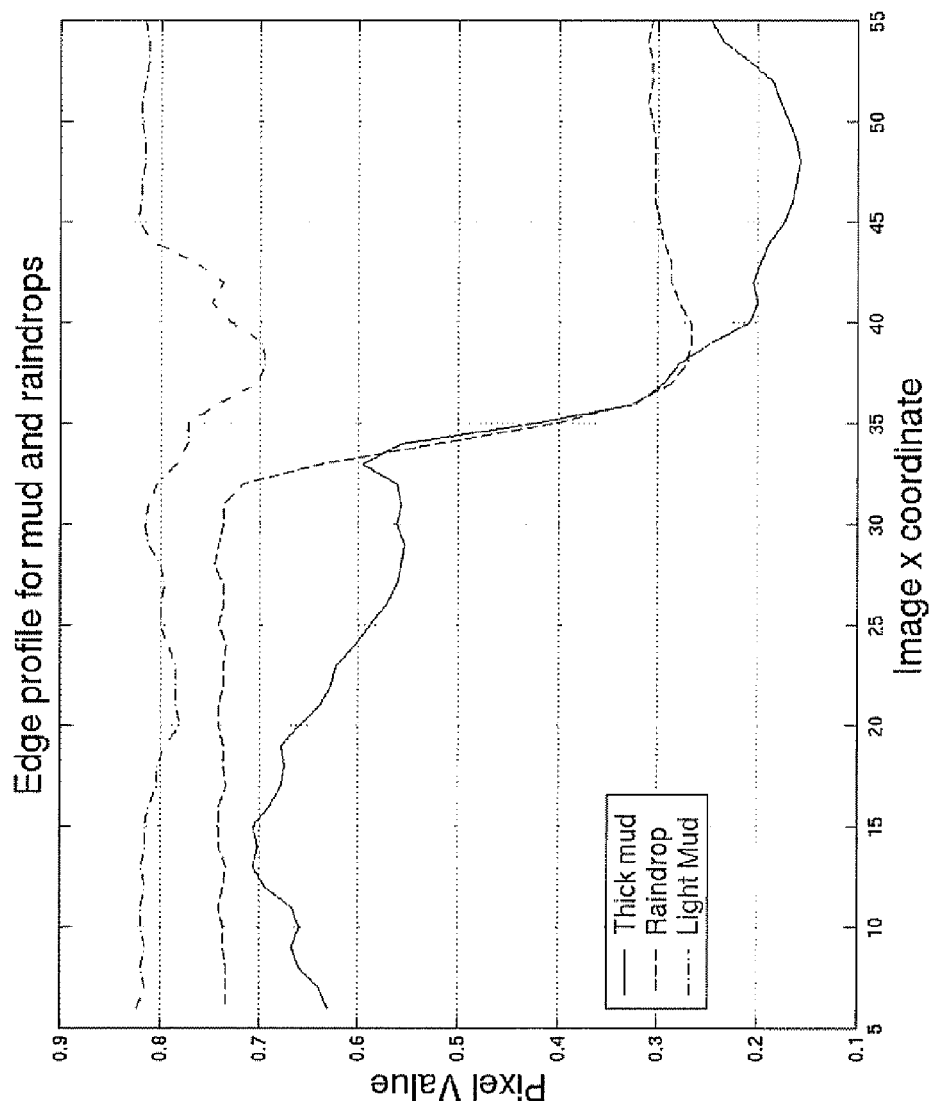
FIG. 14 shows, by way of example, the differences in typical edge profiles of a rain drop edge segment, light mud edge segment and thick mud edge segment.

System 30 locates dominant edges (i.e., edges appearing in both high and low levels of the image resolution). The edges may be tracked over time (a few frames) to determine if the edges are stationary, and classifies the edge profile into thick mud, light mud and rain drop profiles by, for example, template matching (nearest neighbor, normalized correlation). FIG. 14 shows, by way of example, the differences in typical edge profiles of a rain drop edge segment, light mud edge segment and thick mud edge segment. The light mud edge segment is of the lowest contrast. If edges matching the light mud or thick mud profiles persist, system 30 assumes it represents an opaque obstruction 50 such as dirt, mud, snow, smeared insect, bird droppings and the like.

If no match is found, system 30 can further analyze obstruction 50, which is a blob. System 30 grows the blob by up to 3 pixels, to nearest edge point. Blobs that include edge points that more than 50% of the edge points are masked—are discarded. System 30 then classifies edge points on the remaining blobs. If 50% or more of the edge points are classified as thick mud, then the blob is classified as thick mud. If 50% or more of the edge points are classified as light mud, then the blob is classified as light mud. If total area of the blob is above a certain threshold, system 30 attempts to remove obstruction 50 by activating the wipers in step 380 along with mist, which is activated in step 390. If the condition persists the driver is notified. System 30 notifies primary vision system 60 of the extent of the obstruction.

For all overlapping sub-patches in the image (for example, a sub-patch can be of size 10×10 pixels), system 30 counts the number of edge pixels that are classified as light mud, and the number of edge pixels classified otherwise. If the number of edge pixels that are classified as light mud is greater than the rest of the edge pixels by some threshold, then system 30 classifies the blob as light mud. The edges are tracked over time (a few frames) to determine if the edges are stationary. If edges matching the light mud or thick mud profiles persist, system 30 assumes it represents an opaque obstruction 50 such as dirt, mud, snow, smeared insect, bird droppings and the like. Attempt to remove them by activating the wipers in step 380 along with mist, activated in step 390.

(g) For each region with high frequencies not classified in the above mentioned tests, system 30 locates dominant edges (i.e., edges appearing in both high and low levels of the image resolution), tracks the edges over time and determine if the edges are stationary. If a region with high frequencies persists, system 30 assumes it represents a solid obstruction and computes the size of the obstruction 50. If the computed area is larger than some threshold, an attempt to remove is done by activating the wipers in step 380 along with mist, which is activated in step 390.

Figure 7:
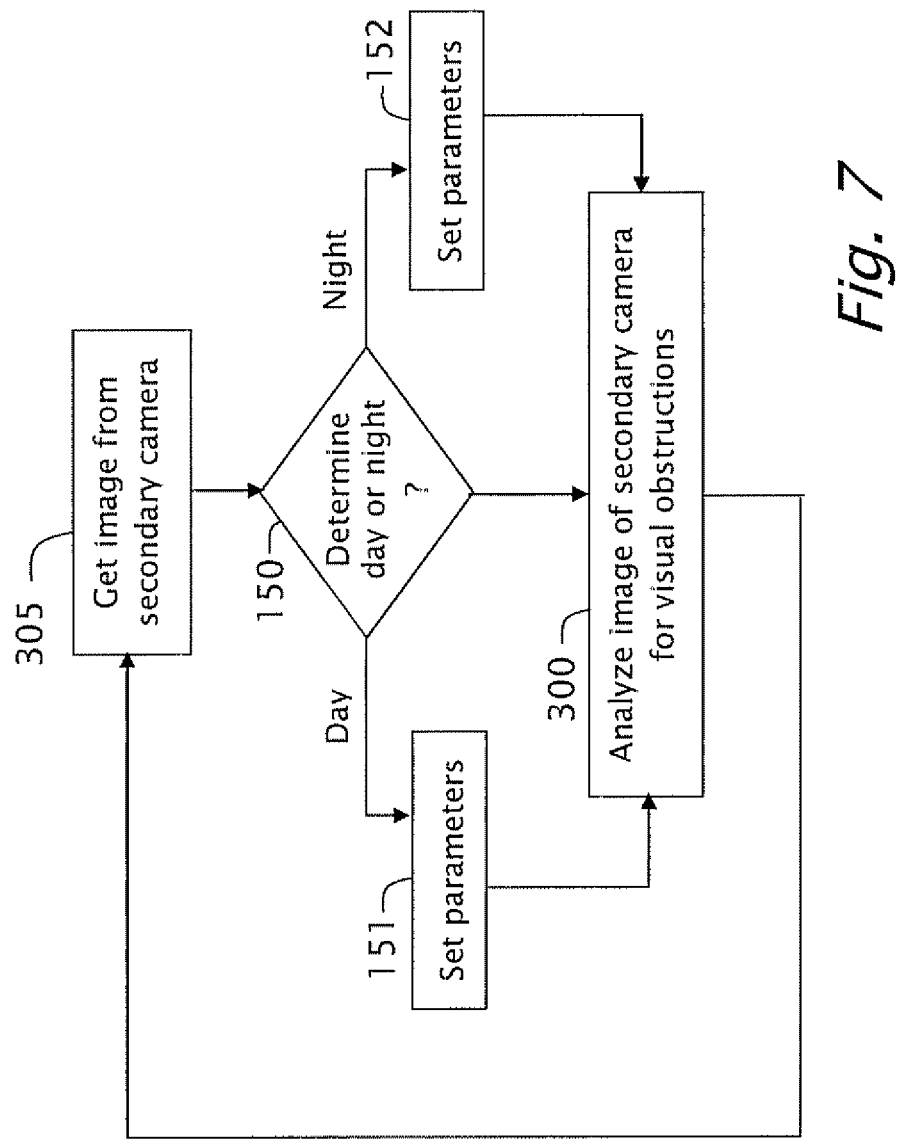
FIG. 7 is a schematic flow diagram outlining an algorithm that exemplifies a method for classifying obstruction types in a camera obstruction detecting system, according with an embodiment of the present invention.

FIG. 7 is a schematic flow diagram illustration of selecting day and night modes for a camera obstruction detecting system 30, in accordance with an embodiment of the present invention. In an initial step 150, system 30 determines if ambient lighting is that of day time or night time and sets system 30 parameters accordingly, in either step 151 or step 152. In the next step 300, system 30 locates and analyzes the images obtained by secondary camera 33 for regions of high spatial frequency, classifies detected obstructions 50 and selects for each type of obstructions actions to be taken. The analysis for high spatial frequencies can be done by using Fourier transform, by comparing the gradient strength in images at various levels of image resolution and/or by any other method known in the art. If high frequencies are detected in step 310, corresponding regions in corresponding images obtained by primary camera 32 are also analyzed for high spatial frequencies. If at least one of the corresponding regions in corresponding images obtained by primary camera 32 lack high frequencies, low visibility analysis 300 proceeds.

Secondary camera 33 is not performing time critical processing and thus, secondary camera 33 can be optionally used for other tasks, to supplement primary camera 32. For example, secondary camera 33 can be used as an ambient light sensor or as a sensor for the gain control of primary camera 32.

In another embodiment of the present invention, system 30 also includes a light source, for example a LED, mounted, for example, inside secondary camera 33 mount. At dark nights, the light source flashes instantaneously, at a low frequency rate, such that the pulsing does not interfere with other operations of primary camera 32. When flashing, the light source illuminates windshield 12 and secondary camera 33, which is synchronized with the timing of the flashing, is imaging the lit windshield 12.

The invention being thus described in terms of embodiments and examples, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system mounted on a vehicle for classifying at least one obstruction on a surface of a window of the vehicle, the system comprising:
    a secondary camera adapted for mounting inside the vehicle, wherein said secondary camera is adapted to focus on at least a portion of the surface of the window and acquire a secondary image of the at least one obstruction when present on the surface; and
    a processor adapted to process said secondary image and for classification of the at least one obstruction; and
    a primary camera adapted for mounting inside the vehicle, wherein the primary camera is configured to acquire a plurality of primary images of the environment through the window,
    wherein a region of the window is subtended by respective fields of view of said secondary camera and said primary camera, and
    wherein said processor is configured to process at least one of said primary images and to trigger said classification of the at least one obstruction responsive to deterioration of image quality in at least one of said primary images.

2. The system of claim 1, wherein information is extracted from said at least one primary image to selectably either enhance said classification of said at least one obstruction or eliminating false identification of an obstruction.

3. The system of claim 1, wherein said deterioration of image quality is caused by said at least one obstruction.

4. The system of claim 1, further comprising:
an activation mechanism operatively attached to said processor, wherein said activation mechanism causes cleaning fluid to be sprayed on the window and windshield wipers to be activated when said processor identifies the at least one obstruction as including dirt on an external surface of the window while the external surface is dry.

5. The system of claim 1, further comprising:
an activation mechanism operatively attached to said processor, said activation mechanism activating windshield wipers when said processor identifies the at least one obstruction on an external surface of the window.

6. The system of claim 1, wherein said processor is adapted to initiate a task to remove said at least one obstruction.

7. The system of claim 6, wherein said task is selected from the group of tasks consisting of: notification of the driver of the vehicle, disabling the system, activating wipers with or without cleaning fluid activating defogging, and turning on fog lights.

8. The system of claim 1, wherein said secondary camera is adapted to also focus on at least a portion of an internal surface of the window and wherein said processor identifies the at least one obstruction when present on said at least a portion of the internal surface.

9. The system of claim 1, wherein said secondary camera is further adapted to perform a task selected from the group of applications consisting of: ambient light sensing, and gain control sensing.

10. The system of claim 1, further comprising a pulsing light source, wherein said pulsing light source is capable of illuminating said region wherein secondary image acquisition by said secondary camera is synchronized with activating said pulsing light source.

11. A method performable by a system mountable inside a vehicle, the system including a primary camera and a secondary camera both connectible to a processor, the method comprising the steps of:
enabling focusing the secondary camera on a surface of the window, to provide at least one secondary image of said surface;
secondary processing said at least one secondary image thereby identifying when present on said surface at least one obstruction;
enabling acquiring a plurality of primary images of the environment through the window, wherein a region of the window is subtended by respective fields of view of the secondary camera and the primary camera; and
primary processing said at least one primary image thereby detecting at least one obstruction, when present on said surface, said at least one obstruction causing a deterioration of image quality in said at least one primary image, wherein said deterioration of image quality in said at least one primary image triggers said secondary processing of said at least one secondary image and said classifying thereby the at least one obstruction.

12. The method of claim 11, wherein said secondary processing includes edge detection of said at least one obstruction.

13. The method of claim 11, wherein said secondary processing of said at least one secondary image uses information extracted from said at least one primary image to selectably either enhance said identifying said at least one obstruction or eliminating false identification of an obstruction.

14. The method, according to claim 11, further comprising a step of:
upon determining a level of ambient light, setting a mode of the system to selectably either day mode, dusk mode or night mode.

15. The method, according to claim 14, when determining said level of ambient light as being of dusk mode or night mode, turning on the headlights.

16. The method of claim 11, further comprising the step of:
initiating at least one task to remove said at least one obstruction.

17. The method of claim 16, wherein said at least one task is selected from the group of tasks consisting of: notification of the driver of the vehicle, disabling the system, activating windshield wipers, spraying fluid on windshield and activating defogging of a window.

18. The method of claim 11, wherein said primary processing of said at least one primary image includes at least one other vehicular vision processing step selected from the group consisting of: detecting lane markings in a road, detecting pedestrians, detecting vehicles, detecting obstacles, detecting road signs, lane keeping, headway keeping and headlights control; and wherein said at least one other vehicular vision processing step is turned off.

19. The method of claim 11, wherein said identifying of said at least one obstruction includes classifying said at least one obstruction, using a Support Vector Machine (SVM) technique.

20. The method of claim 19, wherein said identifying of said at least one obstruction includes classifying use of support vector machine (SVM) with Radial Basis Function kernel techniques.

21. The method of claim 11, further comprising the step of:
illuminating said window with a pulsing light source, wherein said secondary camera is operated synchronously with said pulsing light source.

* * * * *